(12) United States Patent
Issberner et al.

(10) Patent No.: US 8,765,986 B2
(45) Date of Patent: Jul. 1, 2014

(54) METHOD FOR CONTINUOUS HYDROSILYLATION

(75) Inventors: Jörg Issberner, Willich-Neersen (DE); Frank Tlauka, Oberhausen (DE); Tom Beckmann, Duisburg (DE); Alfred Bubat, Wesel (DE)

(73) Assignee: BYK-Chemie GmbH (DE)

( * ) Notice: Subject to any disclaimer, the term of this patent is extended or adjusted under 35 U.S.C. 154(b) by 124 days.

(21) Appl. No.: 13/579,648

(22) PCT Filed: Feb. 18, 2011

(86) PCT No.: PCT/EP2011/052443
§ 371 (c)(1),
(2), (4) Date: Nov. 12, 2012

(87) PCT Pub. No.: WO2011/101441
PCT Pub. Date: Aug. 25, 2011

(65) Prior Publication Data
US 2013/0060058 A1 Mar. 7, 2013

(30) Foreign Application Priority Data
Feb. 19, 2010 (EP) ..................... 10001726

(51) Int. Cl.
*C07F 7/18* (2006.01)

(52) U.S. Cl.
USPC ........ 556/479; 556/456; 556/462; 366/170.4; 366/177.1

(58) Field of Classification Search
USPC ............. 556/456, 462, 479; 366/170.4, 177.1
See application file for complete search history.

(56) References Cited

U.S. PATENT DOCUMENTS

| 4,276,426 | A | | 6/1981 | Lindner et al. |
| 6,121,379 | A | * | 9/2000 | Yamanaka et al. ............ 525/106 |
| 6,291,622 | B1 | | 9/2001 | Droese et al. |
| 6,350,824 | B1 | | 2/2002 | Baumann et al. |
| 6,410,772 | B2 | | 6/2002 | Okuyama et al. |
| 6,897,280 | B2 | | 5/2005 | Heisler et al. |
| 7,074,950 | B2 | | 7/2006 | Ochs et al. |
| 7,208,619 | B2 | | 4/2007 | Bunce et al. |

FOREIGN PATENT DOCUMENTS

| DE | 2851456 A1 | 6/1980 | |
| DE | 4220239 A1 * | 12/1993 | ................ B01F 7/00 |
| DE | 4220239 A1 | 12/1993 | |
| DE | 19859759 CI | 6/2000 | |
| DE | 102006031152 A1 | 1/2008 | |
| DE | 102008032064 A1 | 1/2010 | |
| DE | 102008032066 A1 | 1/2010 | |
| EP | 02701126 A2 | 6/1988 | |
| EP | 1669363 A1 | 6/2006 | |
| JP | 2001294666 A | 10/2001 | |
| JP | 2004537600 A | 12/2004 | |
| JP | 2005179663 A | 7/2005 | |
| JP | 2006500441 A | 1/2006 | |
| WO | WO-9966280 A1 | 12/1999 | |
| WO | WO-03014129 A1 | 2/2003 | |
| WO | WO-2008017552 A1 | 2/2008 | |
| WO | WO-2008017555 A1 | 2/2008 | |

OTHER PUBLICATIONS

"International Application No. PCT/EP2011/052443, International Search Report and Written Opinion mailed Jun. 14, 2011", 10 pgs.
"International Application No. PCT/EP2011/052443, International Preliminary Report on Patentability mailed Aug. 30, 2012", (w/ English Translation of Written Opinion), 5 pgs.

* cited by examiner

*Primary Examiner* — Fereydoun G Sajjadi
*Assistant Examiner* — Pancham Bakshi
(74) *Attorney, Agent, or Firm* — Schwegman, Lundberg & Woessner, P.A.

(57) ABSTRACT

The invention relates to a method for continuously producing silanes and/or organopolysiloxanes by hydrosilylation, in which at least one compound (A) containing at least one carbon-carbon multiple bond is reacted with at least one compound (B) comprising at least one Si—H functionality, wherein the reaction is carried out in a reaction mixing pump.

8 Claims, No Drawings

METHOD FOR CONTINUOUS HYDROSILYLATION

PRIORITY CLAIM TO RELATED APPLICATIONS

This application is a national stage application under 35 U.S.C. §371 of PCT/EP2011/052443, filed Feb. 18, 2011, and published as WO 2011/101441 A1 on Aug. 25, 2011, which claims priority to European Application No. 10001726.8, filed Feb. 19, 2010, which applications and publication are incorporated by reference as if reproduced herein and made a part hereof in their entirety, and the benefit of priority of each of which is claimed herein.

The invention relates to a process for continuous hydrosilylation of compounds containing carbon-carbon multiple bonds with compounds having hydrogen-silicon bonds.

U.S. Pat. No. 6,350,824 B describes the continuous hydrosilylation of siloxanes, in which a mixture of the reactants is conducted continuously through a tubular reactor. It is thus possible to achieve short residence times. However, the inadequate energy removal in the case of strongly exothermic reactions leads to side reactions, called "hotspots" (local overheating) in the reaction zone and difficult reaction control. It is thus not possible to achieve a stable process or stable product quality. In the extreme case such thermal stresses can lead to the decomposition of catalysts, reactants or products and ultimately end in a "runaway". A runaway refers to reactions which can no longer be stopped even by cooling. Local overheating can typically be achieved only by dilution with solvents, lowering of the starting temperature or a reduction of the amount of catalyst used. These measures are effective, but reduce the space-time yield.

WO 03/014129 A1 describes continuous hydrosilylation by means of micro reaction technology. The reactors used are plate heat exchangers, especially "pin-fin" heat exchangers like that described in WO 99/66280 A. Noble metal particles of the catalysts used can block the narrow reaction tubes of the heat exchanger used as the reactor. The reaction is also difficult to control as a result of pressure buildup and pressure drop in the case of siloxanes of relatively high viscosity. The heat exchangers used as reactors are also only of limited suitability for the use of immiscible reactants. Mass transfer restrictions can significantly reduce the overall process rate. For instance, WO 03/014129 A1 for such cases recommends the upstream connection of a dynamic or static mixing apparatus upstream of entry into the reactor and/or the mixing of the reactants with typically static mixing elements which have been introduced into the reactor.

WO 2008/017555 A1 describes a plant and a process for continuous industrial preparation of monomeric organosilanes, which makes use of microstructured heat exchangers. More particularly, a combination of a T mixer, a stainless steel prereactor (diameter 5 to 10 mm, length 40 to 50 mm) and a shell-and-tube heat exchanger, and also parallel-connected stainless steel capillaries or one stainless steel capillary, is used.

WO 2008/017552 A1 relates to a process for continuous industrial manufacture of monomeric polyether alkyl alkoxysilanes. For performance of the process, a combination of a T mixer, a plurality of parallel-connected, exchangeable stainless steel prereactors equipped with random packings, and integrated stainless steel block reactors is disclosed.

Both in WO 2008/017555 A1 and in WO 2008/017552 A1, static mixing processes and tubular multielement reactors are thus used for preparation of relatively low molecular weight, monomeric silanes. In this case, the residence times in the multielement reactors are relatively long and the mixing of the reactants is nonoptimal, which can lead to the problems specified above with regard to product quality.

The continuous hydrosilylation of hydrosilanes with olefins in loop reactors has already been described, for example, in DE 2851456 C2. The reaction proceeds with good mixing and heat removal. However, incomplete reaction, side reactions of the reactants and back mixing of the products with the reactants have to be accepted.

U.S. Pat. No. 6,291,622 B describes a combination of a loop prereactor and a downstream tubular reactor. Two separate plant components give rise to a high level of regulation complexity with relatively high capital and operating costs. Fixed reactant ratios are specified since a one-stage reaction takes place. There are large amounts of reactive reactants in the reaction system; therefore, a high level of safety precautions has to be provided.

EP 1 669 363 A1 also relates to a process for continuous hydrosilylation, except that an integrated loop tubular reactor is used. In this case, the reaction mixture is passed from the tube into the loop and back, such that one tube section is part of the loop circuit. This is intended to avoid particularly the disadvantage of the loop prereactor of U.S. Pat. No. 6,291, 622B. However, a disadvantage in the process of EP 1 669 363 A1 is that the reactants have to be mixed in an upstream mixing chamber by means of suitable mixing units such as stirrers or ultrasound, the temperature being preferably 10 to 35° C. In the reaction tube, the mixing is effected by means of static mixers or by active mixing by means of mixing tools running parallel to the longitudinal axis of the reaction tube. Also disclosed is the use of fixed or exchangeable baffles at the wall of the reactor tube, or mixing is attempted by means of random packings, for example glass bodies, hollow ceramic or glass spheres, or metal turnings. In the loop itself, mixing is achieved by means of static mixers or by active mixing as mentioned above. Mixing by means of the above-mentioned mixing units thus has to be effected in the prereaction chamber, the tubular reactor and the loop, i.e. in spatial separation. The mixing units used lead, especially in the case of use of relatively high-viscosity reactants and/or reactants miscible with one another with poor homogeneity, to inadequate mixing and to inhomogeneous products. The viscosity of the reaction mixture should therefore, according to EP 1 669 363 A1, preferably not exceed 10 000 mPas (at 25° C.)

As mentioned above, it is particularly important to obtain particularly high-quality products substantially free of unwanted by-products. This is important particularly in the case of preparation of those modified organopolysiloxanes which are to be used as additives in impurity-sensitive systems, for example automotive paint systems, or other high-value coatings or thermoplastic or thermoset moldings. Even minor impurities which form, for example, as by-products in the preparation of the modified organopolysiloxanes can lead to surface defects in these fields of application. Specifically the modified organopolysiloxanes are frequently used as agents for improving scratch resistance, as lubricants, defoamers or foam stabilizers, leveling agents, surfactants, water repellents or soil repellents, for example antigraffiti agents, separating agents or wetting agents, in the above fields of use. They can also be used, for example, the modification of polymers or resins, or for treatment of pigments or fillers.

It was an object of the present invention to provide a process for continuously preparing organosilicon compounds such as silanes, but especially also (modified) organopolysiloxanes, which does not have the disadvantages of the prior art. More particularly, local overheating was to be avoided in order to ensure the required maximum product quality and to avoid runaway reactions. At the same time, a high space-time yield was nevertheless to be achieved.

Mixing techniques which necessitate implementation of several active mixing units in several reactor sections or reactors combined with one another were to be avoided, particularly for maintenance and economic reasons. Nevertheless, the process was to ensure that not only mutually soluble, low molecular weight or low-viscosity reactants are usable. Instead, products were also to be obtainable in high quality and good yield even when they are obtained from high-viscosity reactants or reactants with sparing mutual solubility, without needing to use any great amounts of solvent.

The process is additionally to enable a rapid and exact setting of the reaction conditions in order nevertheless to obtain, with shortened reaction time, improved or at least essentially equal selectivities and yields with respect to what is possible by the prior art processes. The shortened reaction times of the process to be provided were also to open up the possibility of conducting the reactions at much higher temperatures than is possible in batchwise processes due to the long reactor residence times. It was also to be possible to react gaseous with liquid reactants. More particularly, the process was also to enable reliable preparation of the target products.

It was a further object to provide a hydrosilylation process which needs only a minimal input of catalyst without conversion losses and hence provides a particularly inexpensive possible synthesis, which additionally leads to less intensely colored products.

The abovementioned objects and problems, and those additionally addressed in the description which follows, are achieved and solved by providing a process for continuously preparing silanes and/or organopolysiloxanes by hydrosilylation, in which at least one compound (A) containing at least one carbon-carbon multiple bond is reacted with at least one compound (B) having at least one Si—H functionality, wherein the reaction is effected in a reaction mixing pump.

Reaction mixing pumps in the context of this invention are preferably of the peripheral wheel pump type and are equipped with
  (a) a rotationally symmetric mixing chamber composed of a peripheral wall and two ends having annular channels connected to one another for flow purposes,
  (b) at least one inlet orifice to the mixing chamber, through which the compound(s) (A) is/are supplied,
  (c) at least one inlet orifice to the mixing chamber, through which compound(s) (B) is/are supplied,
  (d) a mixing rotor driven by magnetic coupling in the mixing chamber, which has chamfers arranged symmetrically at the ends, these forming pressure cells with the annular channels at the ends of the mixing chamber, and the pressure cells being connected to one another via passage bores in the mixing rotor,
  (e) an outlet orifice from the mixing chamber, through which the reaction mixture and/or the product is/are discharged from the reaction mixing pump, and
  (f) a temperature control circuit which can be controlled by an external heating or cooling unit.

Such a rotary mixing pump suitable for the process according to the invention is described, for example, in DE-A-42 20 239, which is incorporated into these applications by reference. The temperature of the pump head therein is controllable via a temperature control circuit by means of an external heating or cooling unit. The periphery consists at least of an optionally heatable metering unit for each reactant and a downstream, optionally heatable line for the reaction mixture.

Various further designs of reaction mixing pumps usable in accordance with the invention are commercially available, for example, under the "HMR" name from K-Engineering (Westoverledingen, Germany). These apparatuses combine the properties of a peripheral wheel pump, a mixer for particularly effective mixing and a reactor. As a result, the apparatus complexity required by the process according to the invention is very low. The mixing chambers of the reaction mixing pump(s) usable in accordance with the invention comprise a bearing carrier and a cylindrical insert element with a peripheral wall which overlaps the mixing rotor. In the peripheral wall of the reaction mixing pump, there is at least one inlet orifice each for the compounds (A) and compounds (B), and one outlet orifice for the reaction mixture.

It has been found to be particularly favorable to configure the inlet orifices of the reaction pumps with nozzle-like narrowing in the direction of the reaction mixing chamber, because this gives rise to a kind of suction effect.

The rotation frequency of the rotor, which is appropriately controlled by means of an external frequency inverter, in the case of performance of the process according to the invention, is typically 50 to 50 000 revolutions per minute.

The reaction volume in the reaction mixing pump is typically 1 to 1000 $cm^3$, preferably 1 to 100 $cm^3$ and more preferably 5 to 100 $cm^3$.

It will be appreciated that the parts of the reaction mixing pump which come into contact with the reactants, the reaction mixture and the reaction product must be manufactured from or be lined with a material which is inert toward the constituents of the reaction mixture. Such materials are, for example, metals or metal alloys, such as Hastelloy, titanium or nickel, plastics such as polyethylene (PE), polypropylene (PP), polyvinylidene fluoride (PVDF) or especially polytetrafluoroethylene (PTFE), or oxide ceramic.

The technical design of the reaction pumps is generally effected according to the desired pressure conditions in the mixing chamber.

If greater amounts of the target product are required, it is also possible to operate a plurality of reaction mixing pumps connected in parallel as a reaction mixing pump aggregate (in the sense of "numbering-up"). For this purpose, the reaction mixing pump is arranged in an apparatus comprising further reaction mixing pumps each independently operated continuously, in which the compound(s) (A) is/are reacted with the compound(s) (B), the reaction mixing pumps being operable simultaneously and independently in parallel. Such parallel operation ensures not just the production of large amounts of product but also high flexibility, since a defective reaction mixing pump operated in such a way can be replaced by another quickly and with a comparatively low level of complexity. Greater reactor reliability is also ensured compared to batchwise processes, since the risk of escape of any great amounts of reactant, reaction mixture and product is avoided in the event of technical problems.

The reaction mixing pumps used in the process according to the invention may additionally be equipped with further possible connections for heating, cooling and purge circuits.

Above-described reaction mixing pumps accelerate the mass and heat transfer processes, with the additional possibility of exact setting of starting and boundary conditions of the reaction. The residence times can be set with particular accuracy, and it is possible to operate the highly exothermic process according to the invention virtually isothermally.

Typical operating parameters of the reaction mixing pumps usable in the process according to the invention are the throughput thereof of preferably 100 ml/h to 1000 l/h, more preferably 100 ml/h to 10 l/h, the temperature in the reaction mixing pump of preferably −50 to 300° C., more preferably 50 to 250° C., the pressure in the reaction mixing pump of preferably 0 to 20 bar, more preferably 0 to 10 bar, the rotational speed of the rotor of preferably 50 to 50 000 revolutions per minute, more preferably 500 to 10 000 revolutions per minute, the residence time in the reaction mixing pump of preferably 0.1 second to 30 min, preferably up to 10 min and more preferably up to 1 min.

In a particular embodiment, the reactor is followed downstream by further reactor systems operated in continuous mode, which can achieve further metered addition of the compound(s) (A) and/or of the compound(s) (B) and/or further temperature control to complete the reaction. The further reaction in the downstream reactor systems in some cases actually ensures the attainment of the desired conversion, which is typically, based on the Si—H functions convertible overall, preferably at least 30%, more preferably at least 70% and most preferably 95% or higher.

In the simplest and most preferred case, a postreactor is in the form of a tube or hose, in each case made from material inert toward the reactants, the reaction mixture and the products. If such simple postreactors are used, there is typically no need to use any further mixing units in the postreactor due to the already excellent mixing in the reaction mixing pump. Typical further reaction times are from 0 to 100 min, preferably 0 to 50 min and more preferably 5 to 30 min.

In a particular embodiment, the downstream reactors used may also be reaction mixing pumps as used in the process according to the invention. In that case, the product stream from the reaction mixing pump used in the process according to the invention is one of the input or reactant streams for the downstream reactor. For example, reactive functional groups in the product of the process according to the invention can be reacted with other compounds in the postreactor.

The reaction products formed from compound(s) (A) and Si—H-functional compound(s) (B) are in the form of addition compounds. Preferably, in the reaction mixing pump, 10 to 100 mol % of the Si—H functions introduced into the reactor by the supply of the Si—H-functional compound(s) (B) are converted in the reactor. In some embodiments of the process, it may be preferable that, for example, only 10 to 50 mol % or to 50 mol % of the Si—H functions introduced into the reactor by the supply of the Si—H-functional compound(s) (B) are converted in the reactor. This is especially true when, as described above, postreactors are used. In some cases, it is also possible in this way to minimize the residence time in the reaction mixing pump, namely if the partial formation of the product causes dissolution or emulsification of the reactants in the product (in addition to the active mixing by the pump) to contribute to homogenization of the reactants. In all cases, however, a minimum proportion of the Si—H-functional compounds introduced continuously into the reactor will react principally (or in some cases also exclusively) with the compound(s) (A) as they are still within the reaction mixing pump. In this regard, the process according to the invention gives the reaction mixture in the reactor a sufficiently long residence time. To determine the degree of conversion, all standard optical analysis processes are suitable, for example Raman, IR or NIR spectroscopy, especially coupled with chromatography processes such as gel permeation chromatography or HPLC. Especially suitable is the observation by IR spectroscopy of the disappearance of the Si—H band.

The process according to the invention ensures the preparation of addition compounds having a particularly homogeneous and high quality. In this context, it should be mentioned that the process particularly suppresses equilibration reactions due to the short residence times. Surprisingly, the formation of unwanted rearrangement products of terminally unsaturated compounds (A)—for example allyl compounds—to those having non-terminal multiple bonds is also very substantially prevented. Such unwanted rearrangement products usually impart an unpleasant odor to the end products, which restricts the usability thereof. It is also significant that the process according to the invention is comparatively easy to manage, as a result of which the underlying strongly exothermic reaction has good controllability. Especially in prolonged operation, the process according to the invention ensures high economic viability.

The compound(s) (A) introduce(s) property-modifying radicals into the Si—H-functional compounds (B), which partly decide the end use of the target products.

The compound(s) (A) used is/are compounds having carbon-carbon multiple bonds. Suitable carbon-carbon multiple bonds are C═C double bonds and CC triple bonds, preference being given to using those compounds having one or more C═C double bonds. The carbon-carbon multiple bonds in the compounds (A) may be present terminally or anywhere else in the compound, preference being given to terminal carbon-carbon multiple bonds. Particular preference is given to compounds (A) containing terminal C═C double bonds. Even though the compounds (A) may contain a plurality of carbon-carbon multiple bonds, it is preferable that they have only one carbon-carbon multiple bond, especially exactly one C═C double bond and more preferably exactly one terminal C═C double bond. No carbon-carbon multiple bonds in the context of this invention are aromatic carbon-carbon bonds. For example, in phenylethene (styrene), only one carbon-carbon multiple bond in the sense of the invention is present, namely that of the vinyl radical in styrene.

Preferably, the carbon-carbon multiple bonds in the compounds (A) are present in functional groups selected from the group consisting of vinyl groups, allyl groups and (meth)acryloyl groups. As usual, the notation "(meth)acryloyl" here too includes both "acryloyl" and "methacryloyl". The compounds (A) are preferably monovinylic, monoallylic or mono(meth)acrylic compounds, which means that they preferably have only one of the groups mentioned, and more preferably no further functional groups containing carbon-carbon multiple bonds are present in the compound. Most preferably, the aforementioned functional groups are present terminally in the compound (A).

The compounds (A) used are preferably those of the general formula (I):

$$CH_2=CR^1-R^2-R \qquad (I)$$

in which
the R radial is a straight-chain or branched alkyl radical having 1 to 30 carbon atoms, an aryl radical having 5 to 12 carbon atoms, an aralkyl radical having 6 to 12 carbon atoms, halogen, epoxy, an NCO—, carboxyl or silyl group, or is an X—$R^3$ group in which X is O, S or $NR^4$ in which $R^4$ is hydrogen or a straight-chain or branched alkyl radical having 1 to 30, preferably 1 to 20 and more preferably 1 to 6, carbon atoms and $R^3$ is hydrogen, a straight-chain or branched alkyl radical having 1 to 30 carbon atoms, an aryl radical having 5 to 12 carbon atoms, an aralkyl radical having 6 to 12 carbon atoms, or a CO—$R^5$ radical in which $R^5$ is a branched or unbranched alkyl or alkenyl radical having 1 to 30, preferably 1 to 20 and more preferably 1 to 6, carbon atoms or
the R radical is a polymeric radical selected from the group consisting of a polyester radical, a polyether radical, a polyurethane radical, a polyester-polyether radical, a polyurethane-polyether radical and a polyester-polyurethane radical, where the polymeric radicals bear an X—$R^3$ group as the terminal group;

the $R^1$ radical is hydrogen or a straight-chain or branched alkyl group having 1 to 4 carbon atoms, preferably hydrogen, methyl or ethyl, more preferably hydrogen or methyl and most preferably hydrogen; and $R^2$ is a carbon-carbon single bond connecting the $R^1$ and R radicals or is a branched or straight-chain group connecting the $R^1$ and R radicals, selected from alkylene groups having 1 to 30, preferably 1 to 20 and more preferably 1 to 6, carbon atoms, aryl radicals having 5 to 12 carbon atoms, for example a phenylene radical, and aralkyl radical having 6 to 12 carbon atoms. Preferably, $R^2$ is a carbon-carbon single bond connecting the $R^1$ and R radicals, a methylene group or a phenylene radical.

The alkyl, aryl or aralkyl radicals or groups and the polymeric radicals may be substituted. Typical substituents are, for example, halogen atoms such as fluorine. The radicals may also contain heteroatoms such as O, S or N.

In a particularly preferred embodiment, in the above formula (I), $R^1$ is hydrogen, $R^2$ is methylene and R is OH or a polymeric radical selected from the group consisting of a polyester radical, a polyether radical, a polyurethane radical, a polyester-polyether radical, a polyurethane-polyether radical and a polyester-polyurethane radical, where the polymeric radicals bear an X—$R^3$ group as the terminal group.

If R is one of the abovementioned polymeric radicals, it can be introduced by first using allyl alcohol $CH_2$=CH—$CH_2$—OH (corresponding to $R^1$=H, $R^2$=methylene and R=OH in the above formula (I)) as the starter compound.

Proceeding from allyl alcohol, by processes known from the literature, one alkylene oxide or a mixture of alkylene oxides, for example ethylene oxide and propylene oxide, can be added onto the OH group by addition, in order to obtain a polyether radical as the polymeric radical. This gives rise to compounds of the formula (I) which can be represented, for example, by the following formula (Ia):

$$CH_2=CH-CH_2-O-[EO]_v-[PO]_w-H \quad \text{(Ia)}$$

in which
EO is a —$CH_2$—$CH_2$—O radical,
PO is a —$CH_2$—CH($CH_3$)—O or —CH($CH_3$)—$CH_2$—O radical, and
v is an integer from 0 to 200, preferably 1 to 100, more preferably 5 to 100, and
w is an integer from 0 to 200, preferably 1 to 100, more preferably 5 to 100, where
v+w is at least 1, preferably 1 to 300, more preferably 5 to 150 and most preferably 10 to 100.

Different proportions of EO and PO units can influence the properties of the modified organopolysiloxanes to be prepared in accordance with the invention. For instance, especially because of the greater hydrophobicity of the [PO] units compared to the [EO] units, the choice of suitable [EO]:[PO] ratios can control the hydrophobicity of the organopolysiloxanes to be prepared.

The resulting terminal OH group can be reacted in turn, for example, with an isocyanate to give a urethane, with a carboxylic acid or anhydride, halide or alkyl ester thereof to give an ester, or with alkyl halide to give a ether.

Instead of linear polyether radicals, it is possible by using glycidyl, glycidyl carbonate or a hydroxyoxetane also to obtain branched structures, as described, for example, in DE 10 2008 032 064 A1, DE 10 2008 032 066 A1 and DE 10 2006 031 152 A1.

The copolymers corresponding to the above-specified structural formula (Ia) may be random copolymers, alternating copolymers or block copolymers. A gradient may also be formed by the sequence of the alkylene oxide units.

Proceeding from allyl alcohol or the above-described OH-terminated allyl polyethers of the formula (Ia), it is possible, for example, to form polyester chains by ring-opening polymerization of one or more lactones, for example caprolactone or valerolactone. It is also possible with hydroxycarboxylic acids corresponding to the lactones. Here too, in the case of use of at least two different lactones, these can be incorporated randomly, alternately, in blocks or in a gradient sequence. In a further preferred embodiment, the polyester radicals are polycarbonate radicals.

For introduction of polyurethane groups, it is possible, for example, to first prepare polyurethane prepolymers with a terminal NCO group, which are then reacted with allyl alcohol.

Instead of the abovementioned allyl alcohol, it is also possible in all cases to use other starter compounds of the formula (I) in which R is OH or another reactive functional group suitable for introduction of the polymeric radicals.

Typical species usable as compounds (A) in the process according to the invention are the allyl and methallyl compounds mentioned in DE 10 2008 032 064 A1, DE 10 2008 032 066 A1 and DE 10 2006 031 152 A1.

Compounds (B) are Si—H-functional compounds, especially hydrosilanes and Si—H-functional organopolysiloxanes. The Si—H-functional organopolysiloxanes may be chain polymers, cyclic polymers, branched polymers or crosslinked polymers. They are preferably chain polymers or branched polymers. They are more preferably chain polymers. An organopolysiloxane is understood herein to mean not just long-chain organopolysiloxanes. The shortest organopolysiloxane chain in the context of this invention is a disiloxane.

The Si—H-functional compound (B) is preferably selected from hydrosilanes of the general formula (II)

$$H-Si(R^6)_m(R^7)_{3-m} \quad \text{(II)}$$

in which
$R^6$ is a branched or unbranched alkyl radical having 1 to 6 carbon atoms, preferably 1 to 4 carbon atoms and more preferably a methyl, ethyl or propyl radical, and
$R^7$ is a branched or unbranched alkoxy group having 1 to 6 carbon atoms, preferably 1 to 4 carbon atoms and more preferably a methoxy, ethoxy or propoxy radical, or $R^7$ is an O(CO)$R^6$ radical or a halogen atom, preferably chlorine, and m=0 to 3, preferably 0 to 2, more preferably 0 or 1;

and/or
Si—H-functional organopolysiloxanes of the general formula (III)

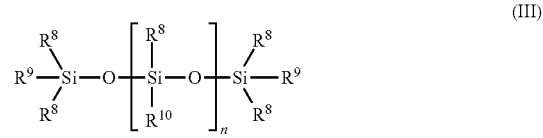

in which
all $R^8$ radicals are each independently straight-chain or branched alkyl radicals having 1 to 30 carbon atoms, preferably 1 to 20 carbon atoms, more preferably 1 to 6 carbon atoms and most preferably 1 carbon atom, aryl radicals having 5 to 12 carbon atoms, preferably 6 to 10 and more preferably 6 carbon atoms, or aralkyl radicals having 6 to 12, preferably 6 to 10 and more preferably 7 carbon atoms;

the $R^9$ and $R^{10}$ radicals are each independently $R^8$ or H, and at least one of the $R^9$ and $R^{10}$ radicals is H; and n=0 to 50 000 preferably 0 to 10 000, more preferably, 0 to 5000 and most preferably 0 to 1000, such as 1 to 500 or 1 to 200.

Typical examples of Si—H-functional silanes usable as compound(s) (B) are trichlorosilane, methyldichlorosilane, dimethylchlorosilane, trimethoxysilane, triethoxysilane, methyldimethoxysilane or methyldiethoxysilane.

Typical examples of Si—H-functional organopolysiloxanes usable as compound(s) (B) are polymethylhydrosiloxanes ($R^8$=methyl, $R^9$ and $R^{10}$=methyl or hydrogen, where at least one of the $R^9$ and $R^{10}$ radicals is hydrogen and n=0 to 50 000, preferably 0 to 10 000, more preferably 0 to 5000 and most preferably 0 to 1000, such as 1 to 500 or 1 to 200).

If a plurality of different compounds (A) are to be reacted with an organopolysiloxane of the general formula (III), the organopolysiloxane must have a number of Si—H functionalities corresponding to the number of different compounds (A).

In the case of use of various compounds (A) and/or (B), the compounds (A) can be supplied premixed to an inlet orifice of the reaction mixing pump, or via separate inlet orifices. The same applies to the compounds (B).

If the starting organopolysiloxane of the general formula (III) contains only one or two terminal Si—H functionalities (which means that one or both $R^9$ is H and all $R^{10}{\neq}H$), the reaction with compound(s) (A) gives what are called end-modified organopolysiloxanes.

If the starting organopolysiloxane of the general formula (III) contains only one or more than one non-terminal Si—H functionality (i.e. both $R^9{\neq}H$ and one or more $R^{10}$=H), the reaction with compound(s) (A) gives organopolysiloxanes with what is called a comb structure.

If the starting organopolysiloxane of the general formula (III) contains both terminal and nonterminal Si—H functionalities (i.e. one or both $R^9$=H and at least one $R^{10}$=H), the reaction with compound(s) (A) gives what are called end-modified organopolysiloxanes with comb structure.

The reaction of the compound(s) (A) with the compound(s) (B) can be performed in a solvent system, but preferably in substance by the processes known to those skilled in the art. A reaction "in substance" is understood herein to mean one which is effected without or very substantially without addition of solvent, not taking account of small amounts of solvent (less than 5% by weight, especially less than 2% by weight, based on the weight of the reaction mixture)—for example introduced into the reaction mixture via the catalyst. If solvents are used, these serve especially to adjust the viscosity. The reaction temperature to be selected also depends on the reactivity of the reactants. Optionally, catalysts known to those skilled in the art are used to accelerate the conversion. Typical catalysts in the hydrosilylation reactions are catalysts based on platinum. Particularly suitable examples appear to be Speyer's catalyst or Karstedt's catalyst (a catalyst composed of $H_2PtCl_6 \cdot 6 H_2O$ and tetramethyldivinyldisiloxane). However, it is also possible to use complex catalysts of Pd, Rh, Ru, Cu, Ag, Au and Ir or those of other transition metals or noble metals or corresponding multielement catalysts. The catalysts are typically used in an amount of 0.1 to 10 000 ppm, preferably 1 to 1000 ppm and more preferably 10 to 500 ppm. Advantageously, they are dissolved or dispersed in the compound(s) (A) prior to entry into the reaction mixing pump.

In one embodiment, compound(s) (A) and compound(s) (B) are supplied to the reaction mixing pump in such a ratio that the ratio of carbon-carbon multiple bonds from compound(s) (A) to Si—H functionality from compound(s) (B) is essentially equimolar, i.e. 1:1.1 to 1.1:1.

In another embodiment, it may be advantageous to supply compound(s) (A) and compound(s) (B) to the reaction mixing pump in such a ratio that the ratio of carbon-carbon multiple bonds from compound(s) (A) to Si—H functionality from compound(s) (B) is selected such that the Si—H functionalities are present in an excess, especially an excess of more than 10 mol %. In that case, the end product still contains Si—H functions, which are reacted, for example, in a downstream reactor, especially a downstream reaction mixing pump, with one or more further compound(s) (A) which differ from the compound(s) (A) used in the first step. In this way, it is also possible to operate more than two reactors or reaction mixing pumps in series.

It is also possible to use the compounds (A) in excess, i.e. to supply compound(s) (A) and compound(s) (B) to the reaction mixing pump in such a ratio that the ratio of carbon-carbon multiple bonds from compound(s) (A) to Si—H functionality from compound(s) (B) is selected such that the carbon-carbon multiple bonds are present in excess, especially an excess of more than 10 mol %.

Typically 10-100 mol %, preferably 20-50 mol %, of the Si—H functions introduced into the reactor through the supply of the compound(s) (B) are converted in the reaction mixing pump.

In a preferred embodiment of the invention, the temperature of the reaction mixture in the reactor is 0-200° C., preferably 10-200° C. and more preferably 50-130° C.

The quotient of total volume of the reaction mixture present in the reactor and the total volume flow rate of the reaction mixture discharged from the reactor in the form of the product stream can be regarded as a measure of the residence time. The relevant comparatively short residence times ensure that, in spite of the relatively high temperatures, unwanted side reactions are perceptible only to minor degree.

The compound(s) (A) and the compound(s) (B) are each normally supplied to the reactor with an inlet temperature of 0-200° C., preferably 10-150° C., more preferably 20-100° C. The difference between the outlet temperature (on exit from the reactor) of the reaction mixture and this inlet temperature is usually 0-200° C., preferably 10-150° C. Typically, the heating output based on the heat supplied from the outside to the reaction mixture in the reactor is 1 to 2000 watts per kg, preferably about 100 to 500 watts per kg.

The present invention also relates to addition compounds preparable by the process described above.

As already described above, these addition compounds feature a particular homogeneous and high quality (narrow molecular weight distribution and relatively low proportion of by-products).

The present invention also relates to the use of the modified silicon compounds prepared by the process according to the invention described above, especially of the modified silanes and organopolysiloxanes, as additives, for example as agents for improving scratch resistance, as lubricants, defoamers, foam stabilizers, leveling agents, surfactants, water repellents or soil repellents, for example antigraffiti agents, separating agents or wetting agents. They can, however, also be used, for example, for modification of polymers or resins, or for treatment of pigments or fillers.

Especially in the case of use as an additive in high-quality coating systems, the high-quality products obtained by the process according to the invention feature broad compatibility and reduce the tendency of the coatings to surface defects, for example the occurrence of craters, pinholes or orange-peel effects.

Specifically in the case of use as leveling and film-forming assistants in automotive OEM or refinishing paint systems, the modified organopolysiloxanes prepared in accordance with the invention play an important role. In such high-quality systems, very pure compounds should be used, which also exhibit minimum intrinsic color. This is especially true of nonpigmented clearcoats. Since the compounds obtained in accordance with the invention need only a minimal amount of catalyst to be used, this prerequisite can be met.

In a particular embodiment, the reaction products formed from compound(s) (A) and compound(s) (B) have viscosities of <1000 mPas, preferably <500 mPas and more preferably <350 mPas, and are suitable as leveling additives.

In another preferred embodiment, the reaction products formed from compound(s) (A) ad compound(s) (B) have viscosities of >1000 mPas, preferably >3000 mPas and more preferably >5000 mPas, and are suitable as defoamers.

The process according to the invention can show its advantages, however, particularly where high-viscosity reactants are to be used and/or high-viscosity products are to be obtained. With only minimal dilution, if any, by solvents, the reactants can be used and reacted in the process homogeneously and within a short reaction time. It is thus possible by this process, for example, to particularly efficiently obtain additives for obtaining a hammered effect (this features homogeneous crater formation) in paints, since the additives for such applications preferably have a viscosity of >10 Pas, more preferably >50 Pas and most preferably >100 Pas, or proceed from compounds of the formula (II) for which n>1000, preferably >1500. In the case of use of other micro reaction processes or even batchwise processes, the viscosities are too high to obtain homogeneous, high-quality products.

The addition of the compound(s) (A) onto the compound (s) (B) introduces modifying groups into the organopolysiloxanes, so as to result in modified organopolysiloxanes. The modification with the compounds (A) makes it possible to optimize the properties of the organopolysiloxanes and adjust them to fit the end use and the application medium.

When the R radicals in formula (I) of the compounds (A) are reactive groups, for example isocyanate, hydroxyl, amino, carboxyl, epoxy, silyl or acrylate groups, the modified polyorganosiloxanes can be reacted, for example, with complementary reactive groups of the constituents of the coating compositions or of the thermoplastic or thermoset moldings, and thus covalently or ionically incorporated into the coating system. In this context, for example, reactors with binders, but also solids such as pigments and fillers, are possible.

When the R radicals in formula (Ia) of the compounds (A) contain principally BO groups, there is usually good compatibility with binders in coating systems. However, such additives also tend to foam stabilization, but this can be suppressed by incorporation of comparatively nonpolar PO units.

The incorporation of aryl or alkyl substituents via the R radicals in formula (I) in turn enables further lowering of the foaming tendency; they are also frequently more thermally stable than polyether-modified compounds of the formula (Ia).

If improved "slip" of a hardened film or increased resistance to scratches, metal marking and soil is expected, typically long-chain Si—H-functional polysiloxanes are used in the process according to the invention where n>1000, especially >5000.

Short-chain modified organopolysiloxanes where, for example, n=1 to 6 and which have been modified with compounds of the formula (Ia) are typically also referred to as silicone surfactants and are used predominantly in aqueous systems. Particularly preferred among the silicone surfactants are those derivable from mono-Si—H-functional compounds (B) of the formula (III).

In addition to use as an additive in aqueous and/or solvent-borne dispersions, especially coating compositions such as paints, it is likewise possible to coat pulverulent or fibrous solids, such as pigments or fillers, with the products obtained by the process according to the invention.

The present invention thus finally also relates to pulverulent or fibrous solids which have been coated with the products obtained by the process according to the invention.

Such coatings of organic and inorganic solids are conducted in a known manner. For example, EP-A 0 270 126 describes such processes. Specifically in the case of pigments, the pigment surface can be coated during or after the synthesis of the pigments, for example by addition of the products obtained in accordance with the invention to the pigment suspension. Pigments pretreated in this way exhibit easy incorporability into the binder system, improved viscosity and flocculation characteristics, and good gloss compared to untreated pigments.

The products obtained by the process according to the invention are used in wide ranges of variable amounts based on the solid to be dispersed. The amount used depends essentially on the size and nature of the surface of the solid. For example, carbon black requires much greater amounts of such additives than titanium dioxide. EP-A 0 270 126 contains examples of pigments and fillers. Further examples are based on new developments, especially in the field of organic pigments, such as in the class of the diketopyrrolopyrroles. Magnetic pigments based on pure iron or mixed oxides can also be incorporated into dispersions with the aid of the products obtained by the process according to the invention. In addition, it is also possible to disperse mineral fillers such as calcium carbonate and calcium oxide or flame retardants such as aluminum hydroxide or magnesium hydroxide. Moreover, matting agents such as silicas are also dispersed and stabilized.

The invention is to be described in detail hereinafter with reference to working examples.

EXAMPLES

Example 1

Inventive

Reaction of a polymethylhydrosiloxane (Baysilon MH 15=Me$_3$Si—[O—SiH(Me)]$_n$—O—SiMe$_3$; viscosity (20° C.)=15 mPas) with 1-octene (preparation of a polymer with comb structure)

The viscosities reported were conducted in the range from 0 to 800 mPas at 20° C. with a Haake VT550 rotary viscometer with the accompanying "NV" system.

First of all, a reaction mixing pump of the HMR-40 type (K-Engineering, Westoverledingen, Germany) and a thermostat of the Huber K25-CC-NR type for the further reaction were brought to a working temperature of 85° C.

Once the working temperatures had been attained, the mass flows from reservoir vessels 1 and 2 (1-octene: 11.9 g/min; Baysilon MH 15: 6.3 g/min) were conveyed continuously by means of pumps 1 and 2 into the reaction chamber of the reaction mixing pump. The platinum catalyst used (Pt-divinyltetramethyldisiloxane) was dissolved in 1-octene beforehand. The amount of platinum catalyst was 0.002% by weight.

The reaction mixing pump was operated, by means of a frequency inverter, at 60% of the maximum possible rotation speed. During the reaction (continuously over 5 hours), a temperature of 79-89° C. was measured in the reaction space of the reaction mixing pump. For further reaction, the reaction mixture was passed through a suitable polytetrafluoroethylene hose in a heated bath of the thermostat.

The hose used for further reaction had an internal diameter of 6 mm and a length of 10 m. The overall system volume (reaction mixing pump and downstream hose) was approx. 288 ml. The overall reaction time (residence time in pump and hose) was approx. 12.5 min.

The result is a pale yellowish product which is slightly viscous at room temperature and has the following analytical data: weight-average molecular weight (determined by means of GPC to DIN 55672 part 1, but with Styragel columns from Waters; eluent: toluene; polydimethylsiloxane standard): approx. 10 000 g/mol; iodine number: 7.5.

Example 2

Inventive

Reaction of Alpol 2000 ($CH_2$=CH—$CH_2$—O[EO]$_x$ [PO]$_y$-Me; viscosity (20° C.)=400 mPas) with $Me_3Si$—[O—SiH(Me)]$_n$—[O—$SiMe_2$], —O—$SiMe_3$ First of all, a reaction mixing pump of the HMR-40 type (K-Engineering, Westoverledingen, Germany) and a thermostat of the Huber K25-CC-NR type for the further reaction were brought to a working temperature of 100° C.

Once the working temperatures had been attained, the mass flows from reservoir vessels 1 and 2 (Alpol 2000: 7.7 g/min; $Me_3Si$—[O—SiH(Me)]$_n$—[O—$SiMe_2$]$_m$—O—$SiMe_3$: 2.3 g/min) were conveyed continuously by means of pumps 1 and 2 into the reaction chamber of the reaction mixing pump. The platinum catalyst used (Pt-divinyltetramethyldisiloxane) was dissolved in Alpol 2000 beforehand. The amount of platinum catalyst was 0.01% by weight.

The reaction mixing pump was operated, by means of a frequency inverter, at 100% of the maximum possible rotation speed. During the reaction (continuously over 5 hours), a temperature of 98-105° C. was measured in the reaction space of the reaction mixing pump. For further reaction, the reaction mixture was passed through a suitable polytetrafluoroethylene hose in a heated bath of the thermostat.

The hose used for further reaction had an internal diameter of 6 mm and a length of 5 m. The overall system volume was approx. 146 ml. The overall reaction time was approx. 15 min.

The result is a product which is pale brownish and moderately viscous at room temperature and has the following analytical data: weight-average molecular weight (determined by means of GPC to DIN 55672 part 1, but with Styragel columns from Waters; eluent: toluene; polydimethylsiloxane standard): approx. 14 050 g/mol; SiH conversion determined by means of IR spectrometry was 100%.

It was thus possible to show that, even in the case of use of high-viscosity reactants, for example Alpol 2000, very high-quality products can be obtained with high space-time yield.

The invention claimed is:
1. A process for continuously preparing silanes and/or organopolysiloxanes by hydrosilylation comprising: obtaining or providing at least one compound (A) containing at least one carbon-carbon multiple bond and at least one compound (B) having at least one Si—H functionality; and reacting the at least one compound (A) and at least one compound (B) by hydrosilylation in the presence of a hydrosilylation catalyst in a reaction mixing pump wherein the reaction mixing pump is of the peripheral wheel pump type and is equipped with:
(a) a rotationally symmetric mixing chamber composed of a peripheral wall and two ends having annular channels connected to one another for flow purposes,
(b) at least one inlet orifice to the mixing chamber, through which the compound(s) (A) is/are supplied,
(c) at least one inlet orifice to the mixing chamber, through which compound(s) (B) is/are supplied,
(d) a mixing rotor driven by magnetic coupling in the mixing chamber, which has chamfers arranged symmetrically at the ends, these forming pressure cells with the annular channels at the ends of the mixing chamber, and the pressure cells being connected to one another via passage bores in the mixing rotor,
(e) an outlet orifice from the mixing chamber, through which the reaction mixture and/or the product is/are discharged from the reaction mixing pump, and
(f) a temperature control circuit which can be controlled by an external heating or cooling unit.

2. The process as claimed in claim 1, wherein the reaction mixing pump has additionally been provided with (g) an inlet orifice for purge liquids.

3. The process as claimed in claim 1, wherein the compound(s) (A) bear(s) at least one terminal C=C double bond or C≡C triple bond.

4. The process as claimed in claim 3, wherein the C=C double bond is part of a vinyl, allyl or (meth)acryloyl group.

5. The process as claimed in claim 3, wherein the compound(s) (A) are those of the general formula (I):

$$CH_2=CR^1-R^2-R \qquad (I)$$

in which
the R radial is a straight-chain or branched alkyl radical having 1 to 30 carbon atoms, an aryl radical having 5 to 12 carbon atoms, an aralkyl radical having 6 to 12 carbon atoms, halogen, epoxy, an NCO—, carboxyl or silyl group, or is an X—$R^3$ group in which X is O, S or $NR^4$ in which $R^4$ is hydrogen or a straight-chain or branched alkyl radical having 1 to 30 carbon atoms and $R^3$ is hydrogen, a straight-chain or branched alkyl radical having 1 to 30 carbon atoms, an aryl radical having 5 to 12 carbon atoms, an aralkyl radical having 6 to 12 carbon atoms, or a CO—$R^5$ radical in which $R^5$ is a branched or unbranched alkyl or alkenyl radical having 1 to 30 carbon atoms or
the R radical is a polymeric radical selected from the group consisting of a polyester radical, a polyether radical, a polyurethane radical, a polyester-polyether radical, a polyurethane-polyether radical and a polyester-polyurethane radical, where the polymeric radicals bear an X—$R^3$ group as the terminal group;
the $R^1$ radical is hydrogen or a straight-chain or branched alkyl group having 1 to 4 carbon atoms; and
$R^2$ is a carbon-carbon single bond connecting the $R^1$ and R radicals or is a branched or straight-chain group connecting the $R^1$ and R radicals, selected from alkylene groups having 1 to 30 carbon atoms, aryl radicals having 5 to 12 carbon atoms and aralkyl radicals having 6 to 12 carbon atoms.

6. The process as claimed in claim 1, wherein the compounds (B) is/are selected from Si—H-functional silanes and Si—H-functional organopolysiloxanes.

7. The process as claimed in claim 6, wherein the Si—H-functional silane has the general formula (II):

$$H\text{—}Si(R^6)_m(R^7)_{3-m} \tag{II}$$

in which
R$^6$ is a branched or unbranched alkyl radical having 1 to 6 carbon atoms, and
R$^7$ is a branched or unbranched alkoxy group having 1 to 6 carbon atoms or R$^7$ is an O(CO)R$^6$ radical or a halogen atom, and
m=0 to 3.

8. The process as claimed in claim 6, wherein the Si—H-functional organopolysiloxane has the general formula (III):

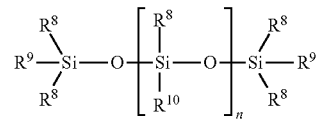

(III)

in which
all R$^8$ radicals are each independently straight-chain or branched alkyl radicals having 1 to 30 carbon atoms, aryl radicals having 5 to 12 carbon atoms or aralkyl radicals having 6 to 12;
the R$^9$ and R$^{10}$ radicals are each independently R$^8$ or H, and at least one of the R$^9$ and R$^{10}$ radicals is H; and
n=0 to 50 000.

* * * * *